US006260622B1

(12) United States Patent
Blok et al.

(10) Patent No.: US 6,260,622 B1
(45) Date of Patent: Jul. 17, 2001

(54) APPARATUS AND METHOD OF INJECTING TREATMENT FLUIDS INTO A FORMATION SURROUNDING AN UNDERGROUND BOREHOLE

(75) Inventors: Reinoud Hendrik Jurgen Blok; Jan Dirk Bossaerts, both of Volmerlaan (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/219,906

(22) Filed: Dec. 23, 1998

(30) Foreign Application Priority Data

Dec. 24, 1997 (EP) .................................................. 97310613

(51) Int. Cl.$^7$ ...................................................... E21B 43/16
(52) U.S. Cl. ........................ 166/305.1; 166/186; 166/191; 166/306
(58) Field of Search ................................... 166/202, 306, 166/305.1, 186, 191, 307, 185

(56) References Cited

U.S. PATENT DOCUMENTS

| | | | |
|---|---|---|---|
| 2,512,801 | * | 6/1950 | Kinney et al. ........................ 166/185 |
| 2,569,026 | * | 9/1951 | Springer ............................... 166/146 |
| 2,569,437 | * | 10/1951 | Baker ................................... 166/146 |
| 2,675,880 | * | 4/1954 | Baker ................................... 166/124 |
| 2,918,973 | * | 12/1959 | Ozinga ................................. 166/171 |
| 2,991,883 | * | 7/1961 | Brown et al. ........................ 166/313 |
| 3,010,518 | * | 11/1961 | Harmon ............................... 166/183 |
| 3,020,960 | * | 2/1962 | Hayward .............................. 166/145 |
| 3,032,108 | * | 5/1962 | Beilstein ............................. 175/4.52 |
| 3,456,724 | * | 7/1969 | Brown .................................. 166/146 |
| 3,487,877 | | 1/1970 | Methven .............................. 166/295 |
| 3,593,797 | | 7/1971 | LeBourg .............................. 279/441 |
| 3,623,550 | * | 11/1971 | Lajarte ................................ 166/125 |
| 3,760,878 | * | 9/1973 | Peevey ................................. 166/185 |
| 3,765,484 | | 10/1973 | Hamby, Jr. et al. ................. 166/278 |
| 3,825,070 | * | 7/1974 | Hoyt ..................................... 166/306 |
| 3,861,465 | | 1/1975 | Mignotte .............................. 166/255 |
| 3,935,910 | | 2/1976 | Gaudy et al. ......................... 175/17 |
| 4,192,375 | | 3/1980 | Maly et al. ............................ 166/51 |
| 4,414,118 | * | 11/1983 | Murphey ........................ 166/307 X |
| 4,595,057 | * | 6/1986 | Deming et al. ...................... 166/269 |
| 4,651,824 | * | 3/1987 | Gradle ................................. 166/245 |
| 5,024,275 | * | 6/1991 | Anderson et al. ................... 166/303 |
| 5,209,296 | * | 5/1993 | Donlon et al. ................... 166/307 X |
| 5,247,993 | * | 9/1993 | Sarem et al. .................. 166/305.1 X |
| 5,335,732 | * | 8/1994 | McIntyre ............................. 166/313 |

FOREIGN PATENT DOCUMENTS 88 01702    5/1988    (DE) ................................ E03B/3/15

OTHER PUBLICATIONS

W. B.Bleakley, Production Editor, "Where we stand on sand consolidation," *The Oil and Gas Journal*, Mar. 13, 1967, pp. 87–93.

* cited by examiner

*Primary Examiner*—David Bagnell
*Assistant Examiner*—Jong-Suk Lee

(57) ABSTRACT

A tool and method are disclosed for injecting various treatment fluids into a formation surrounding an underground borehole. The tool comprises at least three axially spaced swab assemblies which define at least two annular spaces between the tool body and the wellbore. In use the tool is moved through the wellbore whilst a first treatment fluid such as a sand consolidation agent or production stimulation chemical, is pumped via a first annular space into the formation and a second treatment fluid, such as an overflush fluid, is pumped via a second annular space into the formation. The tool allows accurate and continuous injection of various treatment fluids over long intervals into the formation without requiring cycling to new fluids.

9 Claims, 1 Drawing Sheet

APPARATUS AND METHOD OF INJECTING TREATMENT FLUIDS INTO A FORMATION SURROUNDING AN UNDERGROUND BOREHOLE

BACKGROUND OF THE INVENTION

The invention relates to a tool and method for injecting treatment fluids, such as a sand consolidation agent or production stimulation chemical and an overflush fluid, into a formation surrounding an underground borehole.

It is known from U.S. Pat. No. 3,765,484 to treat an unconsolidated e.g. sandy subsurface earth formation surrounding an underground borehole by introducing a treatment fluid which comprises a consolidation agent into the pore spaces of the formation in the vicinity of the wellbore.

The tool known from this prior art reference is designed to inject a treatment fluid into the formation via perforations in a well casing. Other tools for injecting a treatment fluid into a formation via perforations in a well casing are disclosed in U.S. Pat. Nos. 3,487,877; 3,593,910 and 3,861,465.

The known tools generally comprise a pair of axially spaced packers which define an annular space via which the treatment fluid is injected into the surrounding perforations.

A limitation of the known tools is that they are designed to inject a batch of treatment fluid over a limited length interval via perforations into the formation. If parts of the formation surrounding perforations at different levels in a well are to be treated then the tool is moved to another level and the injection of a batch of treatment fluid is repeated once the tool has been positioned adjacent the perforations.

It is an object of the present invention to provide a tool and method which are able to inject treatments fluids, such as a sand consolidation agent, stimulation chemicals and/or overflush fluids over a long interval into a formation surrounding an underground borehole.

SUMMARY OF THE INVENTION

The tool according to the invention thereto comprises
- a tool body which defines a longitudinal axis that extends in use in a longitudinal direction within an underground wellbore;
- at least three axially spaced swab assemblies which are carried by the tool body such that in use at least two axially spaced annular spaces are formed between the tool body and the wellbore; and
- at least two treatment fluid supply conduits which are each connectable in fluid communication with one of the annular spaces.

Preferably the fluid supply conduits comprise a pair of concentric coiled tubings and each fluid supply conduit is connectable to a pump which is adapted to pump fluid at a controlled flow rate via the supply conduit and associated annular space into the pore spaces of the earth formation surrounding the annular space.

The method in accordance with the invention of injecting fluids into a formation surrounding an underground borehole using the above-described tool comprises moving the tool in a longitudinal direction through the wellbore; and simultaneously pumping a first treatment fluid via one of the fluid supply conduits into the pore spaces of the formation surrounding one of the annular spaces whilst a second treatment fluid is pumped via another fluid supply conduit into the pore spaces of the formation surrounding another annular space.

Preferably, the tool is pulled or pushed through the borehole by the supply lines and a preflush fluid is injected into the pore spaces of the formation surrounding the wellbore in front of the tool via an annular space surrounding the supply lines.

It is also preferred that the first treatment fluid is injected via the foremost annular space surrounding the tool body which carries the swab assemblies and a second treatment fluid is injected via the rearmost annular space surrounding the tool body.

If in that case the fluid supply lines comprise a pair of concentric coiled tubings it is furthermore preferred that the first treatment fluid is injected into the foremost annular space via the outer coiled tubing and the second treatment fluid is injected into the rearmost annular space via the inner coiled tubing, which inner tubing extends through the center of the tool body such that it is in fluid communication with the rearmost annular space.

Furthermore it is preferred that the first and second treatment fluids are pumped into the annular spaces at controlled pump rates which are proportional to the speed at which the tool is moved through the wellbore.

The tool and method according to the present invention enable injection of treatment fluids over any length of an underground formation surrounding a wellbore in an accurate, simple and reliable manner.

The tool according to the invention allows continuous pumping of treatment fluids into the formation while the tool is moved along the target completion zone. The treatment fluids are pumped continuously via the annular spaces between the swab assemblies into the formation. At any one time only a limited zone is treated, resulting in improved placement. No wellbore cycling to new fluids is necessary because the annular spaces between the swab assemblies remain filled with one type of fluid thus further improving placement. As a result of more efficient placement treatment volumes can be reduced. The interval length which can be treated is increased at significantly reduced cost.

The tool and method according to the invention can be used for any matrix treatment of longer completion intervals in which more than one treatment fluid needs to be placed into the formation.

It is observed that U.S. Pat. No. 3,935,910 discloses a method for molding a protective sleeve and tubing onto the bore-hole wall during drilling. The known sleeve and tubing, however, form an impermeable internal lining of the wellbore which protect the borehole against caving in and no material is injected into the surrounding formation.

Furthermore, it is observed that Australian patent AU 548335 discloses a well sampling device which comprises a series of resilient packer elements between which two annular spaces can be created via which pore fluids can be sampled simultaneously from different levels in the well. The known device is, however, not moved through the well during the sampling activity. Finally it is observed that German gebrauchsmuster DE 8801702 U discloses a water purification well in which water is injected radially into an annular sandy layer surrounding the well via an upper annular space and subsequently sucked into the well via a lower annular space. Also this device is not moved through the well during the water purification process.

BRIEF DESCRIPTION OF THE DRAWING

The method and tool according to the invention will be described in detail with reference to the accompanying drawing in which.

DETAILED DESCRIPTION OF THE INVENTION

Figure 1:
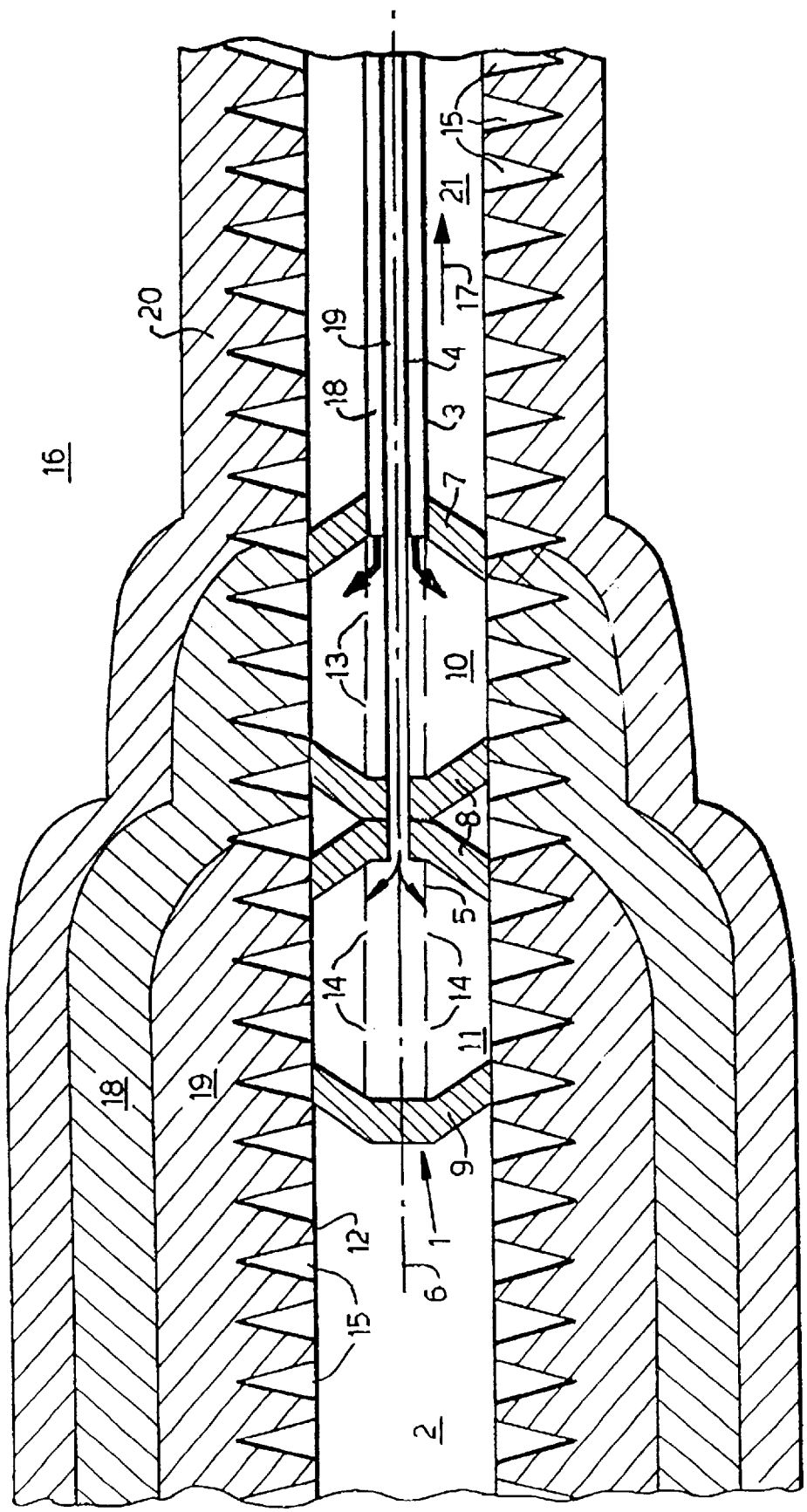
FIG. 1 shows a diagrammatic longitudinal sectional view of a preferred embodiment of the tool in an underground borehole.

In FIG. 1 there is shown a fluid injection tool 1 according to the invention which is pulled through an underground borehole 2 by fluid supply conduits comprising a pair of co-axial coiled tubings 3 and 4.

The tool comprises an elongate tool body 5 which defines a longitudinal axis 6 that coincides with a central axis of the borehole 2.

The tool body 5 carries three axially spaced swab assemblies 7, 8 and 9 which form two axially spaced annular spaces 10 and 11 between the tool body 5 and the wall 12 of the borehole 2.

The first annular space 10 is in fluid communication with the interior of the outer coiled tubing 3 via perforations 13 that are drilled through the wall of the tool body 5.

The second annular space 11 is in fluid communication with the interior of the inner coiled tubing 4 via perforations 14 that are drilled through the wall of the tool body 5.

In the example shown the wall 12 of the borehole is formed by a steel casing 12 into which a series of perforations 15 have been shot using a perforation gun. These perforations also extend through a cement annulus (not shown), if any, surrounding the casing 12 and into the surrounding oil and/or gas bearing formation 16.

As illustrated by arrow 17 the tool 1 is pulled through the borehole 2 by the coiled tubings 3 and 4.

At the same time a first fluid 18 is pumped at a controlled rate via the outer coiled tubing 3, the first annular space 10 and perforations 15 into the pore spaces of the surrounding formation 16. Simultaneously a second fluid 19 is pumped at a controlled rate via the inner coiled tubing, the second annular space 11 and perforations 15 into the pore spaces of the surrounding formation.

Also at the same time a preflush fluid 20 is pumped down via the annulus 21 between the outer coiled tubing 3 and the casing 12 and perforations 15 into the formation 16.

In this manner three concentric annular fluid layers are injected into the formation 16 while the tool 1 is pulled through the borehole 2. The most outward annular fluid layer contains the preflush fluid 20 and the most inward annular fluid layer contains the second fluid 19, which suitably is an overflush fluid.

The intermediate annular fluid layer contains the first fluid 18 which suitably contains a formation consolidation agent or a chemical for stimulating production of oil and/or gas via the pore space of the formation 16.

The tool 1 according to the invention can be used for any matrix treatment of longer completion intervals in which more than one treatment fluid needs to be placed into the formation 16.

The swab assemblies 7, 8 and 9 can comprise single or multiple swab cup assemblies that are known per se.

Instead of using the tool 1 in a cased borehole 2 it may be used in an open i.e. uncased borehole as well, provided that in such case the swab assemblies 7, 8 and 9 are sufficiently flexible to provide effective seals between the subsequent annular spaces 21, 10 and 11.

The tool (1) allows accurate and continuous injection of various treatment fluids (18, 19, 20) over long intervals and at well defined depths into the formation (16) surrounding the borehole (2) without requiring cycling to new fluids.

We claim:

1. A tool for injecting treatment fluids into a formation surrounding an underground borehole, the tool comprising:

a tool body which defines a longitudinal axis that extends in use in a longitudinal direction within an underground wellbore;

at least three axially spaced swab assemblies which are carried by the tool body such that in use at least two axially spaced annular spaces are formed between the tool body and the wellbore wherein the swab assemblies are effective to maintain a sealing relationship with the borehole as the tool is moved through the borehole; and at least two treatment fluid supply conduits which are each connectable in fluid communication with one of the annular spaces wherein the fluid supply conduits are effective to supply fluids to the annular spaces as the tool is moved through the borehole.

2. The tool of claim 1 wherein the fluid supply conduits comprise a pair of concentric coiled tubings.

3. A method for injecting treatment fluids into formation surrounding an underground borehole, the method comprising:

providing a tool, the tool comprising:

a tool body which defines a longitudinal axis that extends in use in a longitudinal direction within an underground wellbore, at least three axially spaced swab assemblies which are carried by the tool body such that in use at least two axially spaced annular spaces comprising at least a foremost annular space and a rearmost annular space are formed between the tool body and the wellbore wherein the swab assemblies are effective to maintain a sealing relationship with the borehole as the tool is moved through the borehole, at least two treatment fluid supply conduits which are each connectable in fluid communication with one of the annular spaces wherein the fluid supply conduits are effective to supply fluids to the annular spaces as the tool is moved through the borehole moving the tool in the longitudinal direction through the wellbore; and pumping simultaneously a first treatment fluid via one of the fluid supply conduits into the pore spaces of the formation surrounding one of the annular spaces whilst a second treatment fluid is pumped via another fluid supply conduit into the pore spaces of the formation surrounding another annular space resulting in the treatment fluids being sequentially placed in the formation.

4. The method of claim 3 wherein the tool is pulled or pushed through the borehole by the treatment fluid supply conduits and further comprising a step of injecting a preflush fluid into the pore spaces of the formation surrounding the wellbore in front of the tool via an annular space surrounding the treatment fluid supply conduits.

5. The method of claim 3 wherein the first treatment fluid is injected via the foremost annular space surrounding the tool body which carries the swab assemblies and the second treatment fluid is injected via the rearmost annular space surrounding the tool body.

6. The method of claim 5, wherein the treatment fluid supply conduits comprise a pair of concentric coiled tubings, and further comprising the steps of injecting the first treatment fluid into the foremost annular space via the outer coiled tubing and injecting the second treatment fluid into the rearmost annular space via the inner coiled tubing, which inner coiled tubing extends through the center of the tool body such that the inner coiled tubing is in fluid communication with the rearmost annular space.

7. A method for injecting treatment fluids into formation surrounding an underground borehole, the method comprising:

providing a tool, the tool comprising:
a tool body which defines a longitudinal axis that extends in use in a longitudinal direction within an underground wellbore, at least three axially spaced swab assemblies which are carried by the tool body such that in use at least two axially spaced annular spaces comprising at least a foremost annular space and a rearmost annular space are formed between the tool body and the wellbore wherein the swab assemblies are effective to maintain a sealing relationship with the borehole as the tool is moved through the borehole, and at least two treatment fluid supply conduits which are each connectable in fluid communication with one of the annular spaces wherein the fluid supply conduits are effective to supply fluids to the annular spaces as the tool is moved through the borehole;

moving the tool in a longitudinal direction through the wellbore; and simultaneously pumping a first treatment fluid via one of the fluid supply conduits into the pore spaces of the formation surrounding one of the annular spaces whilst a second treatment fluid is pumped via another fluid supply conduit into the pore spaces of the formation surrounding another annular space while the tool is moving through the wellbore, resulting in the treatment fluids being sequentially placed in the formation wherein the first treatment fluid comprises a sand consolidation agent and the second treatment fluid is an overflush fluid.

8. A method for injecting treatment fluids into formation surrounding an underground borehole, the method comprising:

providing a tool, the tool comprising:
a tool body which defines a longitudinal axis that extends in use in a longitudinal direction within an underground wellbore, at least three axially spaced swab assemblies which are carried by the tool body such that in use at least two axially spaced annular spaces comprising at least a foremost annular space and a rearmost annular space are formed between the tool body and the wellbore wherein the swab assemblies are effective to maintain a sealing relationship with the borehole as the tool is moved through the borehole, at least two treatment fluid supply conduits which are each connectable in fluid communication with one of the annular spaces wherein the fluid supply conduits are effective to supply fluids to the annular spaces as the tool is moved through the borehole;

moving the tool in a longitudinal direction through the wellbore; and simultaneously pumping a first treatment fluid via one of the fluid supply conduits into the pore spaces of the formation surrounding one of the annular spaces whilst a second treatment fluid is pumped via another fluid supply conduit into the pore spaces of the formation surrounding another annular space while the tool is moving through the wellbore, resulting in the treatment fluids being sequentially placed in the formation wherein the first treatment fluid comprises a chemical for stimulating the production of oil from the underground formation and the second treatment is an overflush fluid.

9. A method for injecting treatment fluids into formation surrounding an underground borehole, the method comprising:

providing a tool, the tool comprising:
a tool body which defines a longitudinal axis that extends in use in a longitudinal direction within an underground wellbore, at least three axially spaced swab assemblies which are carried by the tool body such that in use at least two axially spaced annular spaces comprising at least a foremost annular space and a rearmost annular space are formed between the tool body and the wellbore wherein the swab assemblies are effective to maintain a sealing relationship with the borehole as the tool is moved through the borehole, at least two treatment fluid supply conduits which are each connectable in fluid communication with one of the annular spaces wherein the fluid supply conduits are effective to supply fluids to the annular spaces as the tool is moved through the borehole;

moving the tool in a longitudinal direction through the wellbore; and simultaneously pumping a first treatment fluid via one of the fluid supply conduits into the pore spaces of the formation surrounding one of the annular spaces whilst a second treatment fluid is pumped via another fluid supply conduit into the pore spaces of the formation surrounding another annular space while the tool is moving through the wellbore, resulting in the treatment fluids being sequentially placed in the formation wherein the first treatment fluid comprises a chemical for stimulating the production of gas from the underground formation and the second treatment is an overflush fluid.

* * * * *